United States Patent [19]
Moore

[11] 3,850,048
[45] Nov. 26, 1974

[54] HAND OPERATED ACTUATING DEVICE FOR A VEHICLE BRAKE PEDAL

[76] Inventor: Pearl K. Moore, 1200 Chestnut St., Nelsonville, Ohio 45764

[22] Filed: Oct. 3, 1973

[21] Appl. No.: 403,322

[52] U.S. Cl............................ 74/491, 74/481, 74/512
[51] Int. Cl....... G05g 1/00, G05g 11/00, G05g 1/14
[58] Field of Search....................... 74/491, 481, 512

[56] References Cited
UNITED STATES PATENTS
3,226,997  1/1966  Malloy.............................. 74/491 X

*Primary Examiner*—Leonard H. Gerin

[57] ABSTRACT

An attachment for a vehicle to permit hand opeation of the vehicle brake pedal without requiring an individual to use his feet to apply such pressure, this being intended for use by paraplegics and others which are physically disabled, the device including a bracket intended to be mounted beneath the steering post of a vehicle and having a rotatable shaft extending laterally of the bracket substantially normal to the axis of the steering post and with one end of the shaft connected by a linkage assembly to the brake pedal in a manner such that rotation of the shaft about its axis in one direction will apply the brake pedal whereas rotation in the opposite direction will release the brake pedal, a spring associated with the shaft to retain the same normally biased in the brake released position, and a lever arm having a socket at one end adapted to be slidably received on the shaft for positioning at any selected location therealong, the lever arm having a handle portion formed at the opposite end thereof, the socket being positionable on the shaft to any position selected for the comfort of the driver, such as to the left, center of, or right of the steering post.

5 Claims, 4 Drawing Figures

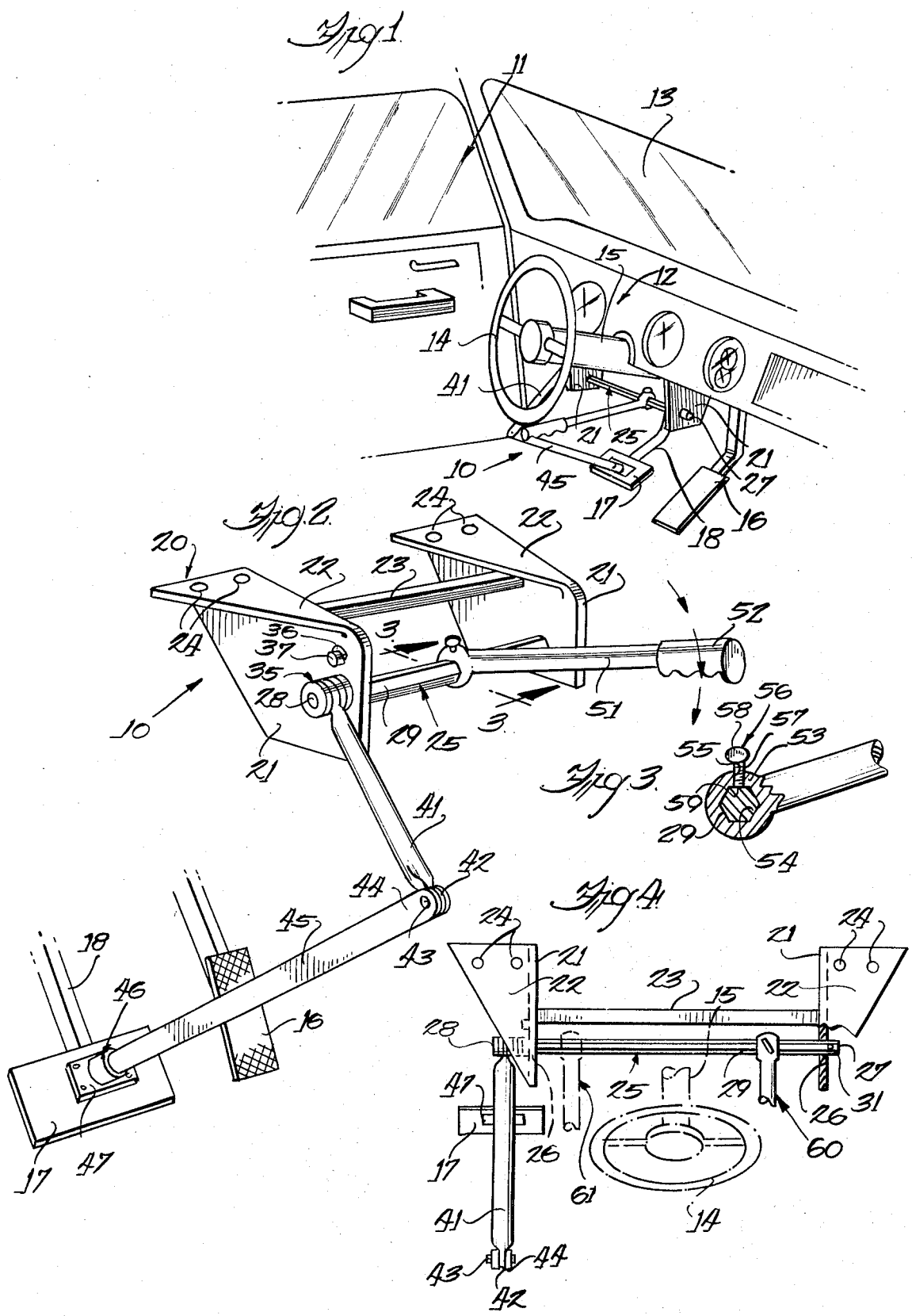

HAND OPERATED ACTUATING DEVICE FOR A VEHICLE BRAKE PEDAL

BACKGROUND OF THE INVENTION

1. Field of the Invention

This invention relates generally to vehicle attachments and more particularly to a novel device for actuating the brake pedal of a vehicle by use of an individual's hand rather than the use of an individual's feet or legs.

2. Description of the Prior Art

In this day and age it is almost a necessity to use a vehicle in going from location to location, with an individual who drives his own vehicle having a feeling of independence over those who must use public transportation. Thus, disabled persons must presently rely on others to transport them from location to location even though except for the particular disablement they would be completely capable of driving a vehicle without outside assistance.

While prior art devices take this into account as to the placing of throttle controls and the like on the dashboard or adjacent the steering post for operation by disabled persons, such as paraplegics unable to use their feet to operate the gas and brake pedals, such devices require lengthy installation procedures, are overly complex and subject to maintenance and repair problems, and are not universally adaptable to vehicles of all makes, sizes, and types. Further, such devices which are associated with the brake pedal normally require that a power assisted brake pedal be provided as they do not provide sufficient leverage force for an individual to apply the conventional normal unpowered brake of a vehicle.

SUMMARY OF THE INVENTION

The present invention recognizes the plight of paraplegics and the deficiencies and disadvantages of presently available devices which attempt to assist the paraplegic in operating the brake pedal of a vehicle, and provides a novel solution thereto in the form of a hand operated actuating device which is readily mounted on all vehicles without requiring any special modifications to the vehicles and without requiring any special skills or expertise, the device being readily removed from one vehicle and installed on another vehicle should the first vehicle be sold or disabled by the individual, such device when being removed from the vehicle not leaving any noticeable marring or modification in the vehicle so removed from so as not to affect the sales price thereof.

It is a feature of the present invention to provide a hand operated actuating device for a vehicle brake pedal readily usable by paraplegics not having use of their feet or legs.

A further feature of the present invention provides a hand operated actuating device for a vehicle brake pedal which is readily mounted to the vehicle without requiring any special tools, skill or expertise and without requiring the making of any permanent alterations or modifications to the vehicle.

Still a further feature of the present invention provides a hand operated actuating device for a vehicle brake pedal which is adapted to be mounted on vehicles of all types and manufacture and which is provided with a readily adjustable operating arm which may be shifted in any position between the left, center and right of the steering post upon the making of a simple adjustment by the vehicle driver such that the arm may be shifted as required for the comfort and convenience of the driver.

The provision of a hand operated actuating device for operating a vehicle brake pedal, such as briefly outlined above, and possessing the stated features and advantages, constitutes the principal features and advantages of the present invention. The provision of a hand operated actuating device for operating a vehicle brake pedal which is relatively simple in its construction and which therefore may be readily manufactured at a relatively low cost and by simple manufacturing methods; one which is relatively devoid of moving parts and which therefore is unlikely to get out of order or require high maintenance or repair expenses; one which is rugged and durable and which therefore may be guaranteed by the manufacturer to withstand many years of untroubled usage; one which is aesthetically pleasing and refined in appearance so as to not overly detract from the interior appearance of the vehicle; one which may, in its entirety, be manufactured and installed as part of the original equipment of the vehicle, or which may be readily attached to the vehicle later as an accessory item and transferred between vehicles as an accessory item as required; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a portion of the interior passenger compartment of a vehicle having the device of the present invention mounted thereto;

FIG. 2 is a perspective view of the device of the present invention as connected to a brake pedal;

FIG. 3 is an enlarged cross-sectional view taken along Line 3—3 of FIG. 2; and

FIG. 4 is a top plan view of the device of the present invention.

DESCRIPTION OF THE PREFERRED EMBODIMENT

Referring now to the drawings in detail there is illustrated a preferred form of a hand operated actuating device adapted for the operation of a vehicle brake pedal and which is constructed in accordance with the principles of the present invention and which is designated generally by the reference numeral 10. The device 10 is intended to be mounted in the passenger compartment 11 of a vehicle having the normal dashboard 12, windshield 13, steering wheel 14, steering post 15, gas pedal 16, and brake pedal 17 which is mounted on a shaft 18 which extends outwardly therefrom in a normal manner to be connected by suitable linkage (not shown) to the vehicle braking system (not shown).

The device 10 includes a bracket 20 having a pair of spaced apart side frame members 21 extending in a vertical direction and having horizontal flange portions 22 formed integrally therewith along the top edges thereof, the side members 21 fixedly interconnected by a crosspiece 23, the flanges 22 each including therein a pair of openings 24 extending transversely therethrough and adapted to receive therein suitable fastening means (not shown), such as screws, bolts and the like for securing the bracket 20 to the underneath portion of the dashboard 12 in a manner straddling the steering post 15.

A shaft 25 is rotatably supported for movement about its axis between side members 21 in laterally aligned openings 26 provided therein, the shaft including cylindrical end portions 27 and 28 which are interconnected by the shaft body 29 having a hexagonal cross-section extending between the confronting interior surfaces of the side members 21. The end 27 is provided with a diametric extending aperture 31 extending therethrough adjacent the exterior surface of the side member 21 and adapted to receive a cotter pin (not shown) or the like therein to retain the same in the associated opening 26. The end 28 has disposed concentrically thereabout a coiled spring 35 having one end connected to the shaft with the opposite end 36 extending outwardly therefrom and engaged about a projection 37 from the associated side frame 21 to fixedly retain the end 36 in position, the spring 35 exerting a counter-clockwise force on the shaft 25. The end 28 is fixedly attached to an arm member 41 which radially extends outwardly from the shaft and has the projecting end 42 thereof pivotally connected by a pivot pin 43 to one end 44 of a second rod member 45 which extends from the pivot connection 43 downward to terminate in a ball and socket joint 46 which has a plate 47 associated therewith and which is adapted to be fastened to the brake pedal 17. The preferred mounting of the device 10 is for the arms 41 and 45 to define a vertical plane bisecting the brake pedal 17 in order to apply a direct pressure thereto, such as shown in FIG. 4, with it being understood that this alignment is not a requirement of the present invention.

To effect the rotation of shaft 25 about its longitudinal axis there is provided a lever arm 51 having a hand grip portion 52 at one end thereof with the opposite end 53 having an open ended hexagonal shaped socket 54 extending therethrough normal to the axis of the lever arm and of a size and configuration to be slidingly received on the shaft body 29. Extending normal to the axis of the hexagonal bore 54 is a threaded opening 55 which extends radially outwardly therefrom and which is adapted to receive therein a fastener 56 having a threaded shank portion 57 which is threadedly received in opening 55, and an enlarged flattened head portion 58, the fastener 56 adapted to be gripped between the thumb and forefinger of an individual's hand to effect the rotation of the fastener about the axis of its shank 57 in a first direction to engage the bottom end 59 with an outer surface of the shaft body 29 to frictionally retain the lever arm 51 in a selected position therealong, and rotatable in the opposite direction to free end 59 from shaft body 29 to permit the repositioning of the lever arm therealong, the lever arm projecting outwardly from the shaft body 29 in a direction normal to the axis thereof.

In operation, the bracket 20 is secured beneath the dashboard 12 with ball and socket plate 47 secured to brake pedal 17, after which the vehicle operator slides lever arm 51 along shaft body 29 to a desired position, such as to the far right as indicated by numeral 60 in FIG. 4, or to the far left such as indicated by numeral 61 in FIG. 4, or to any position therebetween within the interior wall surfaces of side members 21, the selected position being readily changed or retained by operation of the thumb screw fastener 56. To actuate the brake 17, the individual grips hand grip portion 52 and moves the lever arm 51 downwardly to effect the clockwise rotation of shaft 25 about its longitudinal axis, this in turn effecting the movement of linkage arms 41 and 45 in a manner to depress the brake pedal 17. To release the brake, the individual merely releases the downward pressure on hand grip 52, this permitting spring 35 to effect the counter-clockwise rotation of the shaft 25 to effect the release of the brake pedal 17 and simultaneously return the hand grip 52 and lever arm 51 to the normal at rest position.

There is thus provided a hand operated actuating device adapted for operating a vehicle brake pedal and having a hand grip portion which is readily movable between different locations between the far left and far right of the steering post of the vehicle, this permitting an individual to change the position of the hand grip at will for purposes of comfort and convenience while always assuring a positive manner of applying the vehicle brake. Further, it is to be understood that the actuating device may be readily mounted on vehicles of all types and manufactures without requiring any special tools, accessory parts, expertise, or the like, and which may be readily removed from one vehicle and installed in a new vehicle without adversely marring or leaving noticeable marks in the vehicle from with it was removed.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A hand operated actuating device for the operation of a vehicle brake pedal and intended for attachment to a vehicle equipped with a brake-operating pedal, the device comprising a bracket member adapted to be mounted to a dashboard of the vehicle within the vehicle passenger compartment, the bracket including a pair of opposed confronting vertical side members each having a horizontally extending flange portion formed integrally with the top edge thereof and extending horizontally outwardly therefrom in opposed directions, a cross member fixedly securing the side members together in their spaced relationship, a shaft extending horizontally between the vertical side members and journaled at its opposite end to the side members for rotation relative thereto, a linkage mechanism having one end fixedly connected to the shaft for rotation therewith, the opposite end of the linkage mechanism adapted to be fixedly attached to the vehicle brake pedal, and a lever arm operatively associated with the shaft and projecting outwardly therefrom substantially normal to the axis thereof and operable to effect rotation of the shaft in opposite directions about its axis to effect the extension and retraction of the linkage mechanism relative thereto in a manner to effect the depressing and release of the brake pedal so as to actuate and de-actuate the vehicle brake.

2. The device as set forth in claim 1 wherein one end of the shaft extends completely through the associated bracket side member and is fixedly attached exterior of the side member to the associated end of the linkage mechanism, a coiled spring disposed concentric with the projecting end of the shaft and having one end fixed to the shaft with the opposite end fixed to the associated side member with the spring biasing the shaft in a direction to deactuate the vehicle brakes.

3. The device as set forth in claim 2 wherein the shaft includes a body member extending substantially completely between the interior surfaces of the side members, the body member having a hexagonal cross-section, and the lever arm having a handle grip portion at the projecting end thereof, the opposite end of the lever arm defining an open ended socket having a hexagonal bore extending therethrough adapted to be slidingly received on the hexagonal shaft body member, the lever arm projecting normal to the axis of the shaft body member, and means for releasably securing the lever arm to selected positions along the length of the shaft body member.

4. The device as set forth in claim 3 wherein the means securing the lever arm along the shaft body member comprises a threaded opening disposed in the socket end of the lever arm and extending radially therethrough normal to the axis of the hexagonal bore, and a fastener having an enlarged head portion with a threaded cylindrical shank portion extending outwardly therefrom and adapted to be threadedly engaged in the threaded opening for selectively engaging and disengaging the terminal end of the shank with an exterior surface of the shaft body member to frictionally retain the lever arm in any selected position therealong.

5. The device as set forth in claim 4 wherein the linkage mechanism comprises a first arm having one end fixedly attached to the projecting end of the shaft with the opposite end projecting radially outwardly therefrom, a second member having one end pivotally attached to the projecting end of the first arm with the opposite end projecting outwardly therefrom at an angle to the axis defined by the first arm, a ball and socket joint mounted at the projecting end of said second arm member, and means adapted to secure the ball and socket connection to the brake pedal to permit flexible movement thereof relative thereto.

* * * * *